(12) United States Patent
Vidal et al.

(10) Patent No.: US 11,799,381 B2
(45) Date of Patent: Oct. 24, 2023

(54) CONTROLLER FOR A FLYBACK CONVERTER

(71) Applicant: Texas Instruments Incorporated, Dallas, TX (US)

(72) Inventors: Jose Vidal, Phoenix, AZ (US); Dinesh Katam, Tempe, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 72 days.

(21) Appl. No.: 17/537,855

(22) Filed: Nov. 30, 2021

(65) Prior Publication Data

US 2023/0170808 A1 Jun. 1, 2023

(51) Int. Cl.
*H02M 3/335* (2006.01)
*H02M 1/08* (2006.01)

(52) U.S. Cl.
CPC ....... *H02M 3/33569* (2013.01); *H02M 1/083* (2013.01)

(58) Field of Classification Search
CPC ............. H02M 3/335; H02M 3/33507; H02M 1/0048; H02M 1/0054; H02M 1/0058
See application file for complete search history.

(56) References Cited

U.S. PATENT DOCUMENTS

| 2011/0095735 | A1 | 4/2011 | Lin |
| 2016/0020699 | A1* | 1/2016 | Shen ................. H02M 3/33507 363/15 |
| 2017/0012538 | A1 | 1/2017 | Sarrenscheen et al. |
| 2017/0288554 | A1 | 10/2017 | Fahlenkamp et al. |
| 2019/0199196 | A1 | 6/2019 | Giombanco et al. |
| 2021/0242789 | A1 | 8/2021 | Su et al. |
| 2022/0085715 | A1* | 3/2022 | Su ........................... H02M 1/44 |
| 2022/0209665 | A1* | 6/2022 | Li ......................... H02M 1/0009 |

OTHER PUBLICATIONS

PCT Search Report; PCT/US2022/051079; dated Apr. 13, 2023; 5 pages.

* cited by examiner

*Primary Examiner* — Gary L Laxton

(74) *Attorney, Agent, or Firm* — Ray A. King; Frank D. Cimino

(57) ABSTRACT

A converter control circuit includes a terminal to be coupled to a switch node. The control circuit includes a valley sensing circuit coupled to the terminal and detects valleys in an oscillating voltage on the switch node. The valley sensing circuit has a first output and asserts a first control signal on the first output indicative of occurrence of a valley. A logic gate has a second output and asserts a second control signal on the second output to turn on a switching transistor. A switch-on control circuit has a first input and a second input. The first input couples to the first output. The second input couples to the second output. The switch-on control circuit asserts a third control signal to turn on the switching transistor responsive to the second control signal indicating that the switching transistor is to be on while the first control indicates a valley.

18 Claims, 3 Drawing Sheets

CONTROLLER FOR A FLYBACK CONVERTER

BACKGROUND

A direct current (DC)-to-DC or alternating current (AC)-to-DC flyback converter converts the input voltage to an output voltage and provides a galvanic isolation between the two voltages. One category of flyback converters is a quasi-resonant flyback converter in which variable frequency is used to determine when to turn on valley switching. For a quasi-resonant flyback converter, turn-on losses by a switch can be eliminated or reduced by operating in a valley switching mode.

SUMMARY

In one example, a control circuit for a converter includes a terminal adapted to be coupled to a switch node of the converter. The control circuit includes a valley sensing circuit coupled to the terminal and configured to detect valleys in an oscillating voltage on the switch node. The valley sensing circuit has a first output and is configured to assert a first control signal on the first output indicative of occurrence of a valley. A logic gate has a second output. The logic gate is configured to assert a second control signal on the second output to turn on a switching transistor coupled to the switch node. A switch-on control circuit has a first input and a second input. The first input is coupled to the first output. The second input is coupled to the second output. The switch-on control circuit is configured to assert a third control signal to turn on the switching transistor responsive to the second control signal indicating that the switching transistor is to be turned on while the first control indicates occurrence of a valley.

In another example, a method of controlling a flyback converter includes turning off a switching transistor coupled to a transformer's primary coil at a switch node. the method includes detecting when current through the secondary coil of the transformer falls to approximately 0 amperes. The method further includes determining when each valley of an oscillatory voltage on the switch node occurs. Responsive to receipt of a signal to turn on the switching transistor, the method includes turning on the switching transistor upon a subsequent occurrence of a valley.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

A flyback voltage converter converts an input voltage (or current) to a desired output voltage (or current) using a transformer with a primary and secondary coil which is connected between the input and output, respectively. The transformer provides galvanic isolation between the input and output. The converter includes a switching element (e.g., a transistor) connected to the primary coil to turn on and off current to the primary coil. One type of a flyback converter is a quasi-resonant flyback converter. A quasi-resonant flyback converter can operate in continuous conduction mode (CCM), in discontinuous conduction mode (DCM), or in boundary conduction mode (BCM). During the CCM, current continuously flows to the transformer's primary coil. During the DCM, current ceases to the transformer during a portion of each switching cycle. The BCM refers to the state in which the switch is turned on as soon as the primary winding's current drops to 0 amperes.

The embodiments described herein are directed to a control circuit for a quasi-resonant flyback converter capable of operating in DCM. However, the disclosed techniques apply to BCM operation as well. The control circuit described herein is particularly useful for primary-side regulated flyback converters in which the control circuit regulates the current through the primary coil of a transformer to thereby regulate the output voltage on the secondary side of the transformer. The control circuit includes a feedback (FB) node adapted to be coupled to the switch node (SW) of a flyback converter. In one embodiment, the control circuit is fabricated as an integrated circuit (IC) and the FB node is a pin of the IC. The control circuit includes circuitry that monitors the FB node for three reasons: (1) zero-cross current sensing, (2) output voltage (VOUT) sampling, and (3) SW node valley sensing. During BCM and DCM operation, after the main switching element (e.g., a transistor) turns off, the secondary coil current of the transformer jumps up and then starts to decay approximately linearly until the secondary current reaches (crosses) zero current, at which time the SW node voltage begins to ring sinusoidally.

The ringing SW node voltage has a series of decaying peaks and valleys. The SW node voltage is coupled across the switching element. When the control circuit determines that the switching element should be turned on, a valley sensing circuit within the control circuit prevents the switching element from turning on until the next SW node voltage valley occurs. By turning on the switching element at a valley of the SW node voltage, switching losses in the switching element are reduced compared to what would be the case if the switching element were turned when the SW node voltage is larger than a valley point during the ringing SW node voltage waveform.

Figure 1:
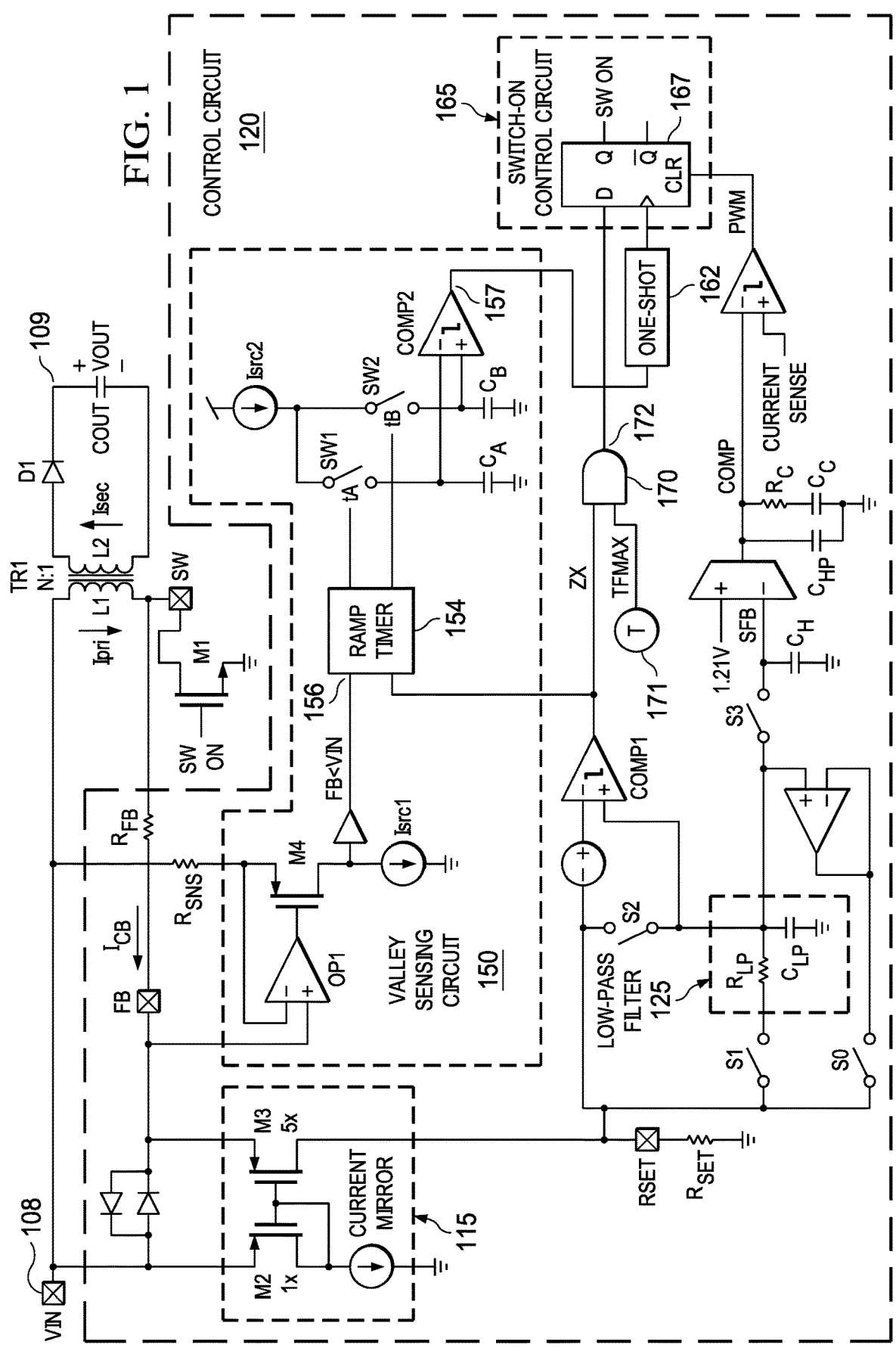
FIG. 1 illustrates a schematic of the control circuit for a flyback converter in accordance with an example.

FIG. 1 is a schematic of a DC-DC flyback converter 100 in accordance with an illustrative embodiment. In this example, the flyback converter 100 includes an input 108 adapted to receive an input voltage (VIN) and an output 109 that provides the output voltage VOUT. The converter 100 also includes a transformer TR1, a diode D1, and a transistor M1 (the switching element mentioned above). The transformer TR1 includes a primary coil L1 and a secondary coil L2. The diode D1 is coupled to the secondary coil L2 and functions to rectify the voltage from the secondary coil. Current Ipri is the current through the primary coil L1, and current Isec is the current through the secondary coil L2. The converter may also include an output capacitor COUT. The voltage across capacitor COUT is VOUT. When M1 is on, current flows from VIN, through the primary coil L1 and through M1 to ground. When M1 is off, the primary coil current is 0 amperes (amps).

The converter has a control circuit 120 which functions to, among other things, determine when to turn M1 and off to thereby regulate the current through the primary side of the transformer in order to regulate VOUT. The flyback converter 100 in FIG. 1 thus employs primary side regulation (PSR). The control circuit 120 includes a valley sensing circuit 150 which ensures that M1 is turned on at a valley of the oscillatory phase of the SW node voltage.

The control circuit 120 regulates VOUT by determining the magnitude of VOUT and adjusting the duty cycle of M1 to maintain VOUT at a target level. However, VOUT is provided on the secondary side of transformer TR1, but the control circuit is connected to the primary side of the transformer. Thus, the control circuit 120 does not have a galvanic connection to VOUT. Instead, the control circuit infers the magnitude of VOUT by monitoring the magnitude of the voltage on the SW node.

Figure 2:
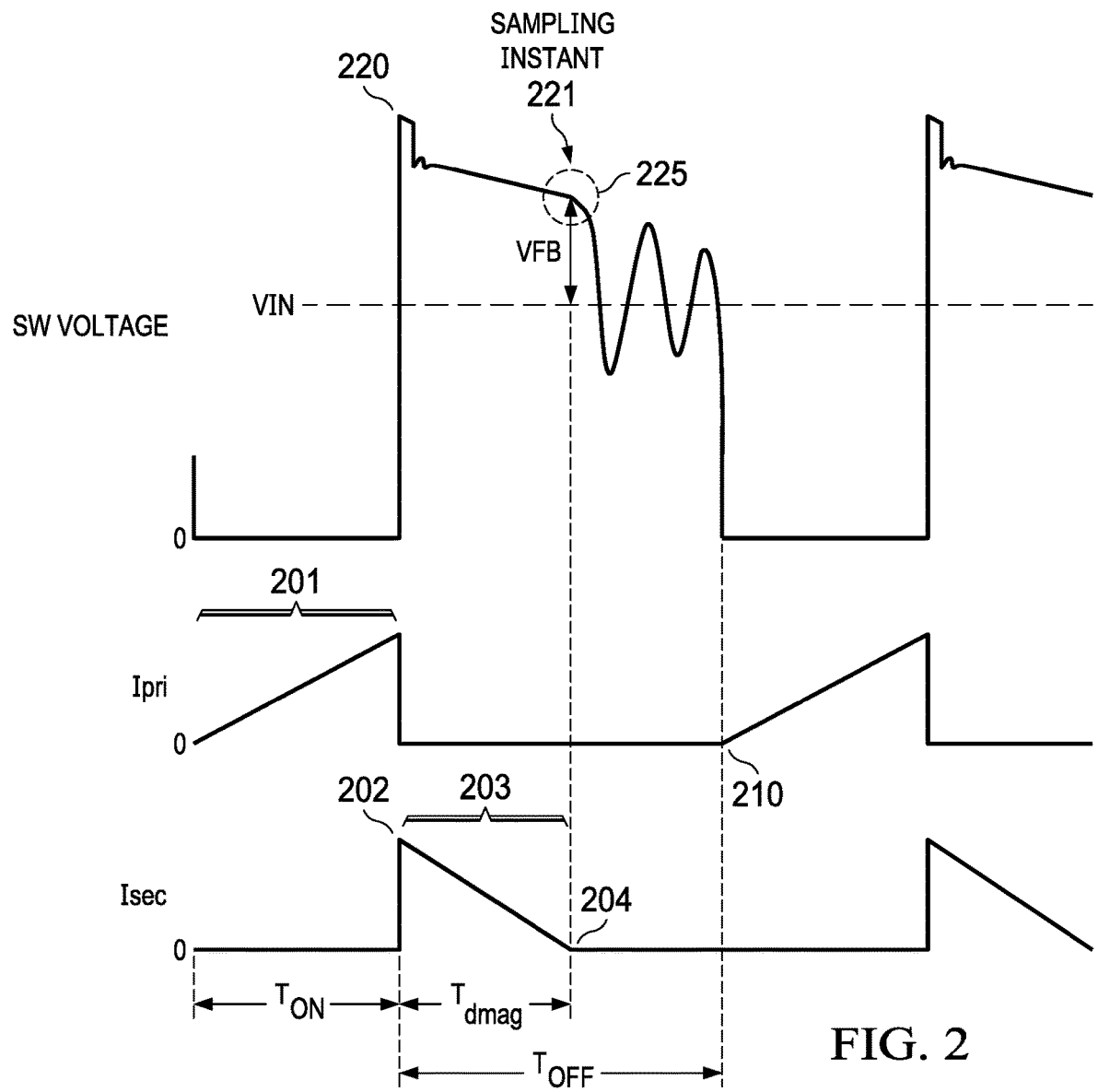
FIG. 2 illustrates a timing diagram of the operation of a primary-side regulated flyback converter in accordance with an example.

FIG. 2 illustrates waveforms of the flyback converter 100 during a switching cycle. The waveforms include VIN, the SW node voltage, and currents Ipri and Isec. When M1 is on, Ipri ramps up approximately linearly as shown at 201. The period of time that M1 is on is identified as Ton in FIG. 2. When the control circuit 120 turns M1 off, Ipri drops to 0 amps and Isec jumps up as shown at 202. Isec then decreases approximately linearly as shown at 203. Eventually, Isec reaches 0 (point 204). The next switching cycle starts at 210. Between point 202 and 210, M1 is off. This time period is identified as Toff in FIG. 2. Between points 204 and 210, not only is Ipri equal to 0 amps, but Isec is also equal to 0 amps.

The SW node voltage is 0V when M1 is on. As soon as the control circuit 120 turns M1 off, the SW node voltage jumps up to a value that is larger than Vin as identified at 220. The magnitude of the SW node voltage is a function of the turns ratio of the transformer, VOUT, the forward voltage drop (Vf) of diode D1, and the product of Isec and Resr. Resr is the sum of the parasitic resistances of diode D1 and capacitor Cout. The voltage of the FB node (Vfb) is directly proportional to the voltage of the SW node, and thus equation (1) provides the above relationship in terms of Vfb:

$$Vfb = VSW - VIN = Nfs*(VOUT + Vf + (Isec*Resr)) \quad (1)$$

where Nfs is the ratio of the number of turns of the primary coil L1 to the number of turns of the secondary coil L2. Once Isec reaches 0 amps at point 204, then the term Isec*Resr equals to 0 and thus Vfb is a function of Vout plus the forward voltage drop of diode D1 (times the turns ratio of the transformer TR1). The control circuit 120 takes advantage of this fact by sampling Vfb at the moment that Isec crosses 0. At that moment, Vfb is largely a function of just Vout. The sampling instant is identified at 221.

Because the control circuit 120 does not have direct electrical access to the secondary coil L2, the control circuit 120 infers when Isec crosses 0 by detecting the beginning of the oscillatory phase of the SW node voltage. In the embodiment described below, the control circuit includes a circuit that detects the "knee" 225 in the SW node voltage which occurs when Isec crosses 0. The knee is characterized by a dramatic change in the slope of the SW node voltage.

Referring again to FIG. 1, the knee 225 is detected using the current mirror 115, resistor Rset, a low-pass filter 125, and a comparator COMP1. During the off-time (M1 off), the switch node voltage is a function of VIN+VOUT. The current mirror includes transistors M2 and M3 and employs a current mirror ratio in this example of 5:1 (the current through M3 is five-times the current through M2. VIN is coupled to the source of M2. The same VIN voltage is also controlled onto the source of M3 due the current mirroring function performed by M2 and M3. For example, if the source of M3 (VFB) is greater than VIN, M3 will sink more current through resistor RFB and VFB will decrease. If VFB is less than VIN, M3 will sink less current and VFB will increase. With the SW node voltage approximately equal to VIN+VOUT and the source voltage of M3 equal to VIN, then the voltage difference across resistor Rfb is approximately VOUT. The current through resistor Rfb is thus approximately equal to Vout/Rfb. Current Ifb flows through M3 down to resistor Rset, thereby producing a voltage on the RSET node equal to approximately VOUT*RSET/Rfb. In other words, the voltage on the RSET node is proportional to VOUT.

As explained above, sampling the SW node voltage at the moment Isec crosses 0 provides a satisfactory approximation of VOUT. The RSET node voltage is low-pass filtered by the low-pass fitler 125 (which includes resistor Rip and Clp in this example), and sampled by the switch S3 and capacitor Ch.

The current mirror 115, resistor Rset, the low-pass filter 125, and the comparator COMP1 are also used to detect the knee 225 in the SW node voltage. As explained above, the voltage across resistor Rset is a function of the SW node voltage and thus has the same or similar waveform shape (including the knee 225 and subsequent ringing). The RSET voltage is couple to the inverting input of comparator COMP1. The low-pass filtered version of RSET is coupled to the non-inverting input of comparator COMP1. Thus, COMP1 compares a more slowly changing version of the SW node voltage to the unfiltered, faster changing live SW node voltage. When the knee 225 occurs, the SW node voltage drops more sharply than the response of the output of the low-pass filter 125 and thus the output of COMP1 (ZX) becomes logic high. A logic high for ZX thus indicates that Iset has crossed 0 amps.

Figure 3:
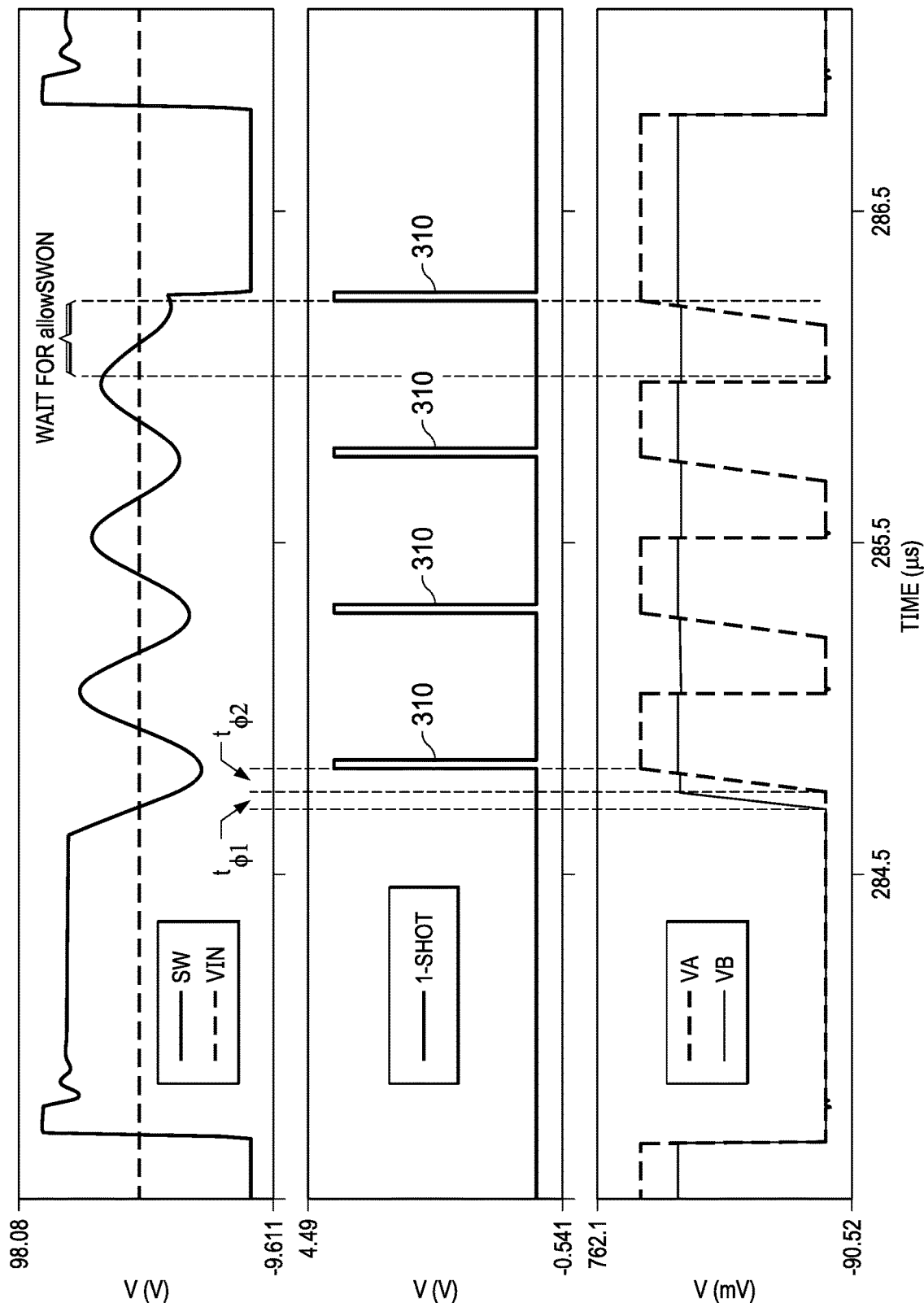
FIG. 3 illustrates a timing diagram for detecting a switch valley in accordance with an example.

The valley sensing circuit 150 includes OP1, transistor M4, current sources Isrc1 and Iscr2, a ramp timer 154, switches SWA and SWB, capacitors CA and CB, and a comparator COMP2. FIG. 3 provides additional waveforms illustrating the operation of the valley sensing circuit 150. The ringing in the SW node voltage is approximately a damped-sinusoidal waveform. Accordingly, the time between a peak and the point in which Vsw crosses Vin is the same as the time between the point at which Vsw crosses Vin and the subsequent valley. Time point 301 is the time at which a peak occurs. Point 302 is the zero-crossing point. Point 303 identifies the subsequent valley. The time difference between points 301 and 302 is the same as the time difference between points 302 and 303. The valley sensing circuit 150 implements an analog timer to measure and save the time between points 301 and 302 and then uses that measured and saved time to estimate when the subsequent valley is occurring.

Referring again to FIG. 1, as explained above, ZX becomes logic high when the knee occurs which is generally coincident with a peak in the ringing phase of the SW node voltage. The ramp timer 154 responds to ZX being high by closing switch SWA. Current Isrc2 thus flows to and charges capacitor CA. The voltage on capacitor CA increases approximately linearly while switch SWA is closed. During the off-phase (M1 off), no current flows through the primary coil L1 or resistor Rfb. Thus, the voltage of the FB node is the voltage of the SW node. The voltages on the inverting and non-inverting inputs of OP1 are approximately equal. The voltage on the non-inverting input of OP1 being the switch node voltage forces the inverting input voltage also to be the switch node voltage. With the switch node voltage being higher than Vin, no current flows through transistor M4, and thus the input 156 to the ramp timer is logic low.

When Vsw falls below Vin, current flows through transistor M4, and the input 156 of the ramp timer 154 is forced high. That logic high thus occurs when the switch (or FB)

node falls below VIN. The ramp timer 154 responds to a logic high assertion on its input 156 by opening switch SWA. The resulting voltage on capacitor CA is a function of the time period between the peak and VIN-crossing points of the SW node voltage. That voltage (CA voltage) is provided to the inverting input of COMP2.

The capacitance of CB is approximately equal to the capacitance of CA and the same current source Isrc2 is used to charge capacitor C2 when switch SWB is closed. Upon opening switch SWA, the ramp timer also closes switch SWB thereby initiating a charge cycle for capacitor CB. The voltage of capacitor CB then begins to increase linearly at the same rate as for capacitor CA. The output 157 of comparator COMP2 becomes logic high the moment that the voltage on capacitor CB reaches the voltage of capacitor CA, which is indicative of when a valley of the SW node voltage should be occurring. FIG. 3 illustrates waveforms for VA (voltage on capacitor CA) and VB (voltage on capacitor CB). As shown, VA is determined during the first period of the ringing SW node voltage ringing and remains fixed for the ensuing ringing oscillations for comparison against VB. Capacitor CB is charged and discharged during each oscillation in order to be compared against VA to determine the occurrence of each valley.

The output 157 of comparator COMP2 is provided to a one-shot 162. In one example, the one-shot produces a 20 ns output pulse upon detecting a logic high on its input. FIG. 3 illustrates that the one-shot 162 produces an output pulse 310 coincident with each valley of the SW node voltage. The output of the one-shot 162 is coupled to an input of switch-on control circuit 165 which in this embodiment includes a D flip-flop (DFF) 167. The output of the one-shot 162 is coupled to the clock input of the DFF 167. The D input of the DFF 167 receives a control signal from AND gate 170. The inputs to the AND gate 170 are the ZX signal (described above) and a TFMAX signal. The ZX signal indicates when Isec crosses 0 amps. During BCM, the control circuit 120 turns on M1 when ZX becomes logic high. During DCM, the control circuit 120 turns on M1 when TFMAX becomes logic high. TFMAX is produced by a timer 171. Accordingly, the output signal 172 from AND gate indicates when a portion of the control circuit 120 determines that M1 should be turned on. The switch-on control circuit 165 functions to turn on M1 when two conditions are concurrently true: (1) AND gate output signal 172 is logic high and (2) the output signal 157 from the comparator COMP2 also is logic high. In other words, the switch-on control circuit 165 will turn on M1 when signal 172 is high but only when comparator COMP2 indicates that the next valley in the SW node voltage is occurring.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon field effect transistor ("MOSFET") may be used in place of an n-type MOSFET with little or no changes to the circuit. Furthermore, other types of transistors may be used (such as bipolar junction transistors (BJTs)).

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

Modifications are possible in the described embodiments, and other embodiments are possible, within the scope of the claims.

What is claimed is:

1. A control circuit for a converter, comprising:
   a valley sensing circuit coupled to a switch terminal, wherein the valley sensing circuit is configured to detect valleys in an oscillating voltage at the switch terminal, the valley sensing circuit having a valley sense output and is configured to provide a first control signal at the valley sense output responsive to an occurrence of a valley;

a logic gate having a logic output, wherein the logic gate is configured to assert a second control signal at the logic output to turn on a switching transistor coupled to the switch terminal; and a switch-on control circuit having first and second switch-on inputs, wherein the first switch-on input is coupled to the valley sense output, the second switch-on input is coupled to the logic output, and the switch-on control circuit is configured to assert a third control signal to turn on the switching transistor responsive to the second control signal indicating that the switching transistor is to be turned on while the first control signal indicates occurrence of a valley.

2. The control circuit of claim 1, in which the switch-on control circuit includes a flip-flop.

3. The control circuit of claim 2, in which the flip-flop includes a data input and a clock input, the data input is coupled to the logic output, and the clock input is coupled to the valley sense output.

4. The control circuit of claim 1, in which the valley sensing circuit includes:
a current source;
a first capacitor coupled in series with a first switch between the current source and a ground terminal;
a second capacitor coupled in series with a second switch between the current source and the ground terminal; and
a comparator having a first comparator input, a second comparator input, and a comparator output, wherein the first comparator input is coupled to the first capacitor, the second comparator input is coupled to the second capacitor, and the comparator output is configured to provide the third control signal.

5. The control circuit of claim 4, in which the switch-on control circuit includes a flip-flop having a data input and a clock input, wherein the data input is coupled to the logic output, and the clock input is coupled to the comparator output.

6. The control circuit of claim 5, further including a one-shot coupled between the comparator output and the clock input.

7. The control circuit of claim 4, wherein capacitances of the first and second capacitors are approximately equal.

8. The control circuit of claim 4, in which the valley sensing circuit includes a ramp timer configured to:
close the first switch responsive to detection of a beginning of oscillation at the switch terminal and open the first switch responsive to a voltage at the switch terminal falling below an input voltage to the converter; and
close the second switch responsive to a voltage at the switch terminal falling below the input voltage.

9. The control circuit of claim 8, in which the ramp timer has a ramp timer input configured to receive a signal indicative of a voltage at the switch terminal being below the input voltage.

10. The control circuit of claim 1, in which the control circuit is adapted to be coupled to a flyback converter.

11. A flyback converter, comprising:
a transformer having a primary coil and a secondary coil;
a switching transistor coupled to the primary coil at a switch terminal;
a control circuit having a feedback input coupled to the switch terminal, wherein the control circuit is configured to:
detect valleys of an oscillatory voltage at the switch terminal; and
to turn on the switching transistor approximately concurrent with an occurrence of a valley of the detected valleys; and
the control circuit including:
a first circuit having a first circuit output and configured to detect the valleys of an oscillatory voltage at the switch terminal when current through the secondary coil reaches zero amperes, and to provide a voltage pulse at the first circuit output that is coincident with each detected valley;
a second circuit having a second circuit output and configured to provide a control signal at the second circuit output to turn on the switching transistor; and
a switch-on control circuit coupled to the first circuit and the second circuit, wherein the switch-on control circuit is configured to turn on the switching transistor responsive to the control signal from the second circuit output indicating that the switching transistor is to be turned on when the first circuit provides a voltage pulse at the first circuit output.

12. The flyback converter of claim 11, in which the switch-on control circuit includes a flip-flop.

13. The flyback converter of claim 12, in which the flip-flop includes a data input and a clock input, wherein the data input is coupled to the second circuit output, and the clock input is coupled to the first circuit output.

14. The flyback converter of claim 13, further including a one-shot coupled between the first circuit output and the clock input.

15. The flyback converter of claim 11, in which the control circuit includes:
a current source;
a first capacitor coupled in series with a first switch between the current source and a ground terminal;
a second capacitor coupled in series with a second switch between the current source and the ground terminal; and
a comparator having a first comparator input, a second comparator input, and a comparator output, wherein the first comparator input is coupled to the first capacitor, the second comparator input is coupled to the second capacitor, and the comparator is configured to provide a third control signal at the comparator output.

16. The flyback converter of claim 15, further including:
a one-shot having a one-shot input and a one-shot output, wherein the one-shot input is coupled to the comparator output; and
a flip-flop having a clock input coupled to the one-shot output.

17. The flyback converter of claim 11, in which the flyback converter is a quasi-resonant flyback converter.

18. A method of controlling a flyback converter having a transformer and a switching transistor, wherein the transformer has a primary coil and a secondary coil, and the switching transistor is coupled to the primary coil at a switch terminal, the method comprising:
turning off the switching transistor;
detecting when current through the secondary coil falls to approximately 0 amperes;
determining when each valley of an oscillatory voltage at the switch terminal occurs by:
charging a first capacitor with a current source for approximately one-quarter of the oscillatory voltage;
charging a second capacitor with the current source; and determining when a voltage on the second capacitor approximately equals a voltage on the first capacitor; and responsive to receipt of a signal to turn on the switching transistor, turning on the switching transistor upon a subsequent occurrence of a valley.

* * * * *